United States Patent Office  
3,419,820  
Patented Dec. 31, 1968

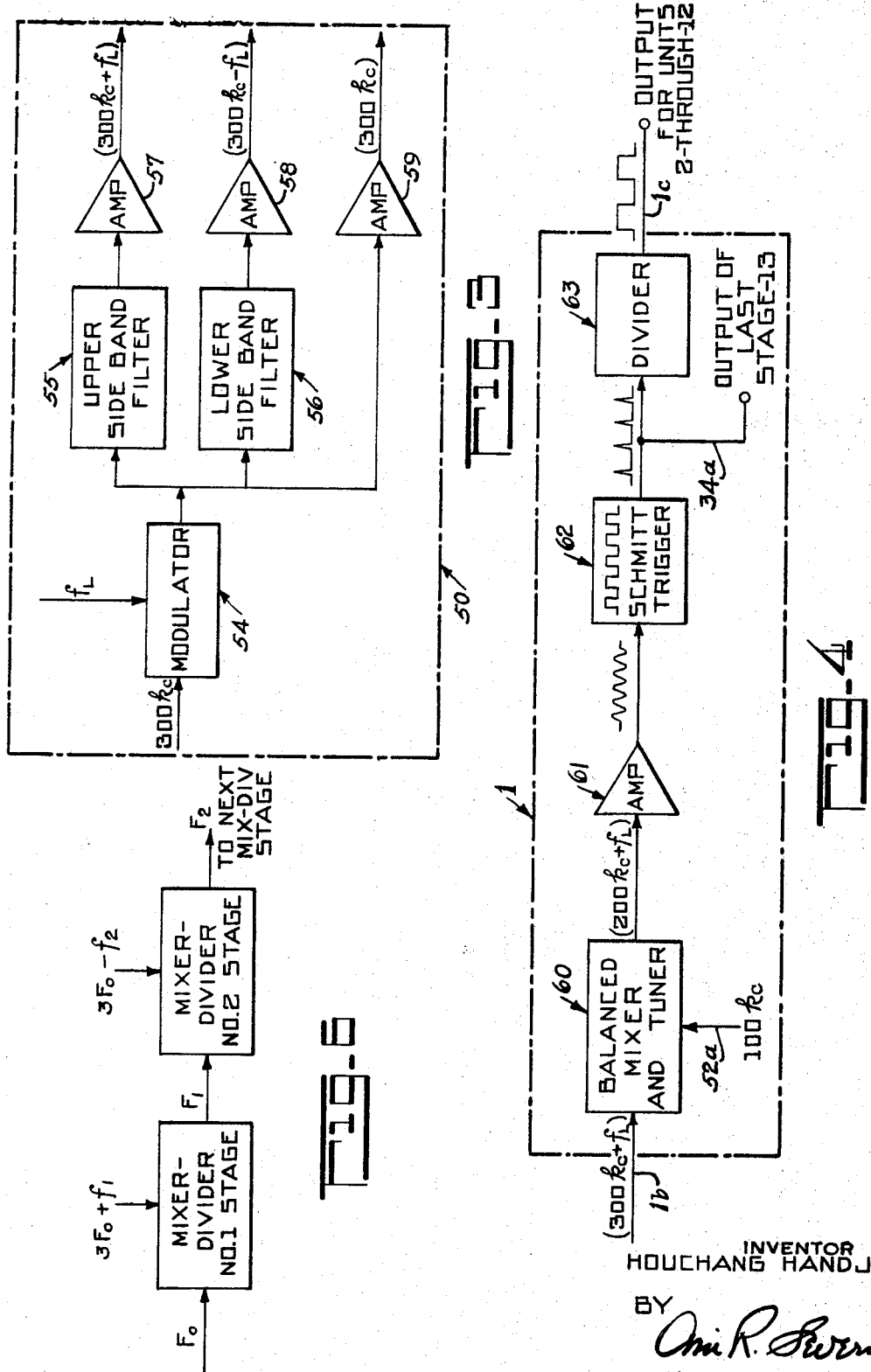

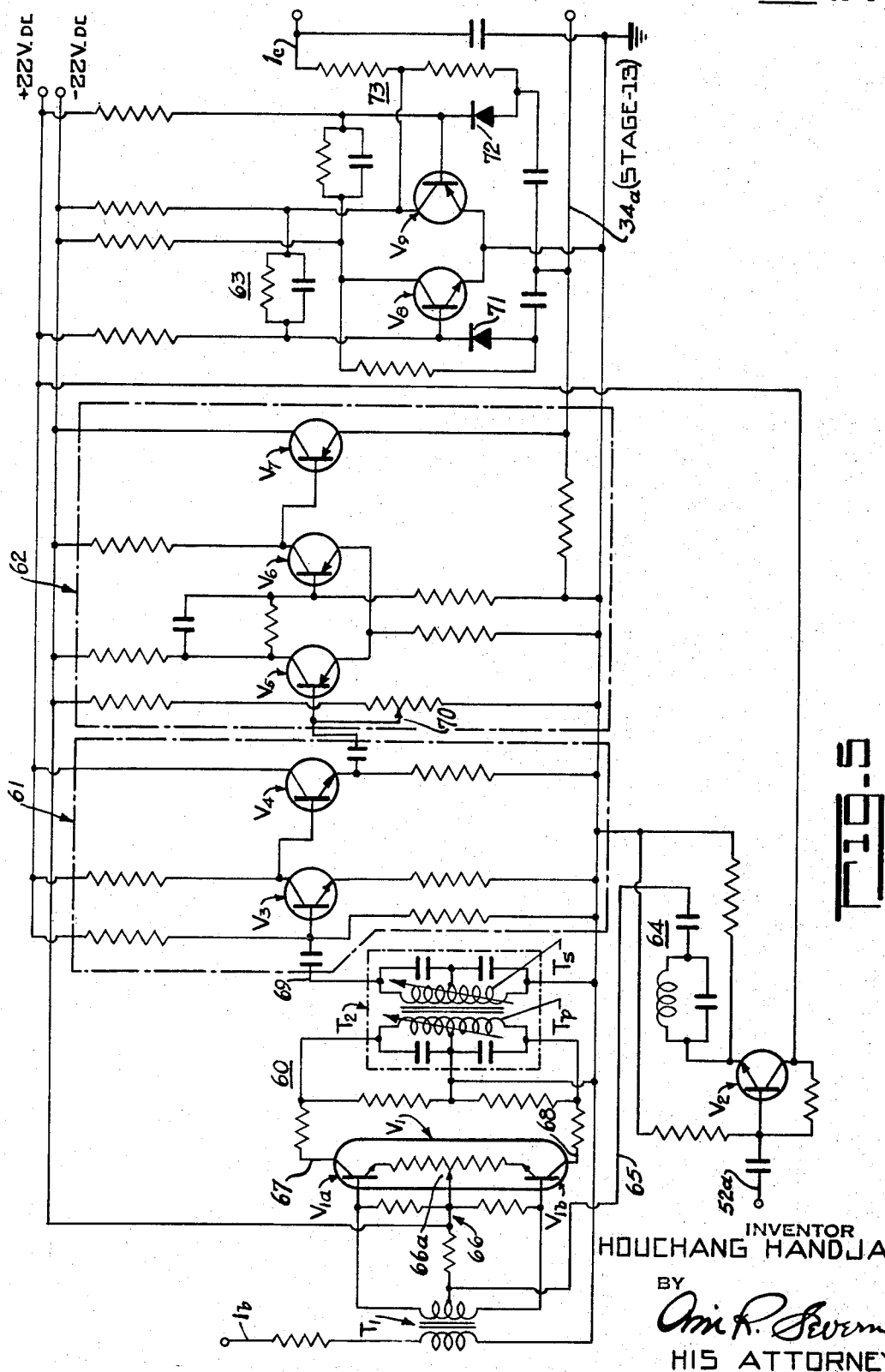

3,419,820  
ELECTRONIC FREQUENCY RATIO GENERATOR  
Houchang Handjani, Cedar Grove, N.J., assignor to Curtiss-Wright Corporation, a corporation of Delaware  
Filed Dec. 6, 1965, Ser. No. 511,883  
10 Claims. (Cl. 332—22)

This invention relates to electronic synthesizers for generating alternating current signals, the frequency of which bears a predetermined ratio to that of a given pure tone signal, the frequency of which may change slowly within a narrow range of an audio spectrum.

Synthesizers of this character, herein called frequency ratio generators, are useful in low frequency spectrum analysis, particularly turbojet engine analyzers having automatic frequency tracking for maintaining a synchronous relationship between the frequency of a test signal from an engine whose governor is set at a predetermined or reference r.p.m., and that of a so-called tracking pure tone signal. Synchronous detection and wave analysis of noise and vibration signals from a turbojet aircraft engine, for example, require generation of signals at frequencies that have continuously a fixed numerical relation or ratio to the engine r.p.m., which in practice slowly "hunts" around the aforesaid reference r.p.m.

Specifically, the purpose of the present invention in a spectrum analyser is to produce an electrical signal, the frequency of which is maintained in given proportion or ratio to the slowly varying frequency of the pure tone r.p.m. tracking signal. The proportionality is maintained by frequency division and conversion means, and its mathematical accuracy can be extended indefinitely. For commercially practical applications, accuracy of approximately 99% or better can readily be obtained by this invention.

A principal object of this invention is to provide an improved frequency ratio generator that is fast and accurate in performance, having electronic frequency dividing and conversion means, whose operation is based on known binary computing principles.

The invention will be more fully set forth in the following description referring to the accompanying drawings, and the features of novelty will be pointed out with particularity in the claims annexed to and forming a part of this specification.

Referring to the drawings:

FIG. 3 is a block diagram of the double side-band modulator of FIG. 2;

FIG. 4 is a block diagram of the mixer-divider components of FIG. 2;

FIG. 5 is a detail drawing of the mixer-divider circuitry indicated in FIG. 4; and FIG. 6 is a function diagram of FIG. 2.

Figure 1:
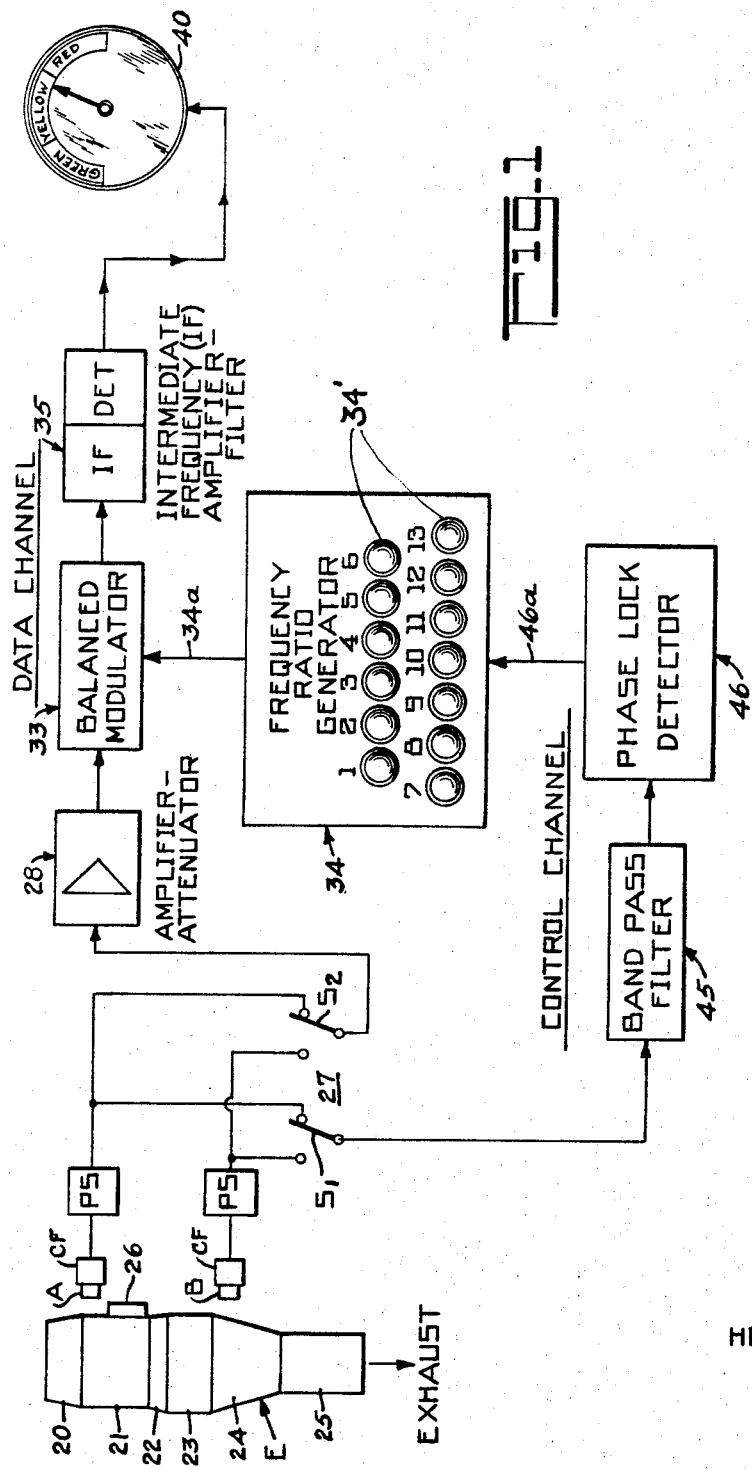
FIG. 1 is a block schematic illustration of a sonic analyser system for a turbojet engine, in which the present invention is used.

A turbojet engine sonic analyzer system to which the present invention is applicable is generally shown in FIG. 1. A system of this character is disclosed and claimed in a copending application Ser. No. 511,667 and now U.S. Patent No. 3,400,578, filed concurrently herewith by Frarey, Handjani and Zabriskie for "Acoustical Analyzer for Indicating Faults in Operative Parts of High-Speed Engines," and assigned to the same assignee as the present invention. This system comprises basically so-called "data" and "control" channels for processing by electronic means electrical signals generated by acoustical pick-up means. The pick-up means, such as sensitive nondirectional microphones, are placed in freely spaced relation near the engine at a region or regions having rotating components of test interest. For testing purposes, an established engine reference speed (r.p.m.) is set into the governor, and any deviation of engine speed therefrom is compensated in order to obtain uniform and reliable component test results.

The output of a microphone located opposite components of the engine to be analyzed comprises localized mixed signals of varying frequencies and amplitudes from the selected region. The output can also include a basic engine speed or tracking signal. These mixed signals are fed to electronic analyzing and r.p.m. tracking equipment in the "data" and "control" channels for selectively indicating the operative condition of a component selected for examination, as compared with that of a normal counterpart.

A turbojet engine E, for example, emits sound of two different characteristics. Rotating components emit sound where the frequency and amplitude are relatively stable and may be predicted or repeated. These are termed "discrete" signals. The action of fuel burning and the interaction of the high velocity exhaust streams with stationary air produces sound or "noise" which is termed "random." The amplitude of an engine component signal, the frequency of which is characteristic of that component, is the sum of a fixed amplitude derived from the rotating element and the random signal at that frequency.

The noise produced by a gear train, for example, is a function of shaft speed and number of gear teeth. In a properly operating gear train, the amplitude of this signal is very low. As the gear train deteriorates, the characteristic signal amplitude increases. The fundamental frequency obtained from a compressor or turbine stage is due to the impulse given the air each time a blade passes a given location. If any blade or blades are damaged, the train of impulses will not be of uniform amplitude and new frequencies will be introduced. The presence of sideband frequencies indicates damaged blades.

The expected characteristic frequencies for a given rotating element are established for comparative purposes by actual test on a normally functioning engine running at a predetermined or reference r.p.m. For jet engines, the "idle" speed characteristic provides a convenient reference r.p.m. for testing its moving components. The characteristic frequencies, above, for the respective components have been found to fall within definite spectral bands.

In FIG. 1, a conventional turbojet engine E has as essential components a front main bearing section 20, compressor stage section 21, center main bearing section 22, burner section 23, turbine stage section 24 (including rear main bearing), exhaust section 25 and accessory section 26 including gear trains, etc. The sensitive nondirectional microphones A and B (hereinafter called "mikes") are responsive to radiated acoustical energy and are located in noncontact, air-spaced relation to the engine near sections or regions of interest. Accordingly, each mike can pick up for useful analysis acoustical energy radiated from a comparatively large region of the engine. This energy represents the combined sound frequencies, including a comparatively strong and definite r.p.m. signal, such as the initial stage compressor signal from A, or a later stage compressor signal and/or turbine signal from B. In situations where the r.p.m. signal is not sufficiently strong, it may be obtained directly from the engine.

The mike signals are fed selectively through conventional cathode-follower and power supply circuitry CF and PS to the analyser system. Selector 27 conducts at switches $S_1$ and $S_2$ the selected mike signals into a "DATA CHANNEL" and a "CONTROL CHANNEL" of the analyzer. The mike A signals are selected in the present instance for conduction to the data and control channels. The data channel processes the mike signals so as to represent by a voltage responsive meter 40 the comparative mechanical condition and/or functioning of a selected moving part of the engine, and the control channel processes the mike output for r.p.m. "tracking" and control of data channel signal processing, thereby to compensate for ordinary engine speed fluctuations. Test results at the display meter are therefore consistently reliable, as they conform to the ideal condition wherein the engine speed is fixed at "reference" r.p.m.

In the data channel, the mike A signal enters a data input amplifier and normalizing attenuator 28 with manually adjustable gain control. The mike signal amplified and properly attenuated for a test selected component comprises all the discrete frequencies of interest in the region indicated, plus noise.

This composite signal is fed to a balanced modulator 33 where it is mixed with a high frequency signal of frequency $(200+f)$ kc., where $f$ is a low frequency representing one discrete signal, from the control channel, i.e., the frequency ratio generator 34 of the present invention. The signal output of the modulator contains the sums and differences of all the input signal frequencies, among them the 200 kc. signal having an amplitude that is proportional to that of the data channel test signal. The modulator output is fed to the intermediate frequency (IF) amplifier and filter 35 which passes the 200 kc. frequency signals within a narrow-band (15 c.p.s.). The output signal amplitude is averaged at the detector DET, and the resulting DC signal operates a display meter 40 for indicating in order of signal magnitude, the comparative condition of the part tested.

The signals from either mike A or B may be simultaneously processed in the control channel, FIG. 1, for producing the speed-corrected input signal for the balanced modulator 33. The mike signal is fed to a band-pass selectivity filter 45 which selects a signal frequency of interest, say from the initial compressor stage, representing engine r.p.m. The filter has a center frequency $f_c$ equal to the frequency of the compressor stage signal, above, when the engine is running exactly at reference r.p.m. and the pass-band is sufficiently wide to pass the compressor or locking signal frequency $f_L$ through a wide range of r.p.m. fluctuations.

The $f_L$ signal is fed to a phase lock detector 46 which tracks the $f_L$ signal by means of a variable frequency sinusoidal local signal, throughout the characteristic slow "hunting" of engine r.p.m. around the reference r.p.m., while maintaining a phase lock condition between these two signals.

The phase lock detector output comprises a pure tone, sinusoidal r.p.m. signal containing no noise. The phase lock serves to regulate the input for the frequency ratio generator 34 and ties the analyser to the actual engine speed for accurate r.p.m. tracking. A detailed description of the phase lock detector is included in the copending Frarey et al. application, above.

Summarizing briefly, the data channel amplified mike A signal for the balanced modulator contains a frequency $f_1$ that is characteristic of the part under test at the existing engine r.p.m. The frequency of the control channel signal from 34 for the modulator is 200 kc., plus a signal frequency corrected to represent the frequency of the test part at existing r.p.m., i.e., a pure tone signal of frequency $(200+Kf_L)$ kc., where K is a ratio constant.

As corrected for r.p.m. tracking, $Kf_L = f_1$. After mixing of the input signals, above, the modulator output comprises the sum and the difference, respectively, of the mike signal frequency $f_1$ and the frequency ratio generator signal frequency $(200+Kf_L)$ kc. Hence, the modulator output difference frequency $(200+Kf_L)$ kc.$-f_1$ represents simply a 200 kc. signal which is of constant frequency and amplitude modulated, the amplitude of which corresponds to the amplitude of the test signal. Other signal combinations, including the output sum frequency $(200+Kf_L)$ kc.$+f_1$ are suppressed by the IF narrow-band filter; data channel processing is completed by IF amplification and detection of signals for the display meter 40.

The frequency ratio generator of the present invention lends itself especially well to a sonic analyzer system, as shown in FIG. 1, because of its flexibility and adaptation to quick adjustment for testing in sequence different engine parts, each having characteristic discrete signal frequencies $f_1$, $f_2$, $f_3$, etc.

Figure 2:
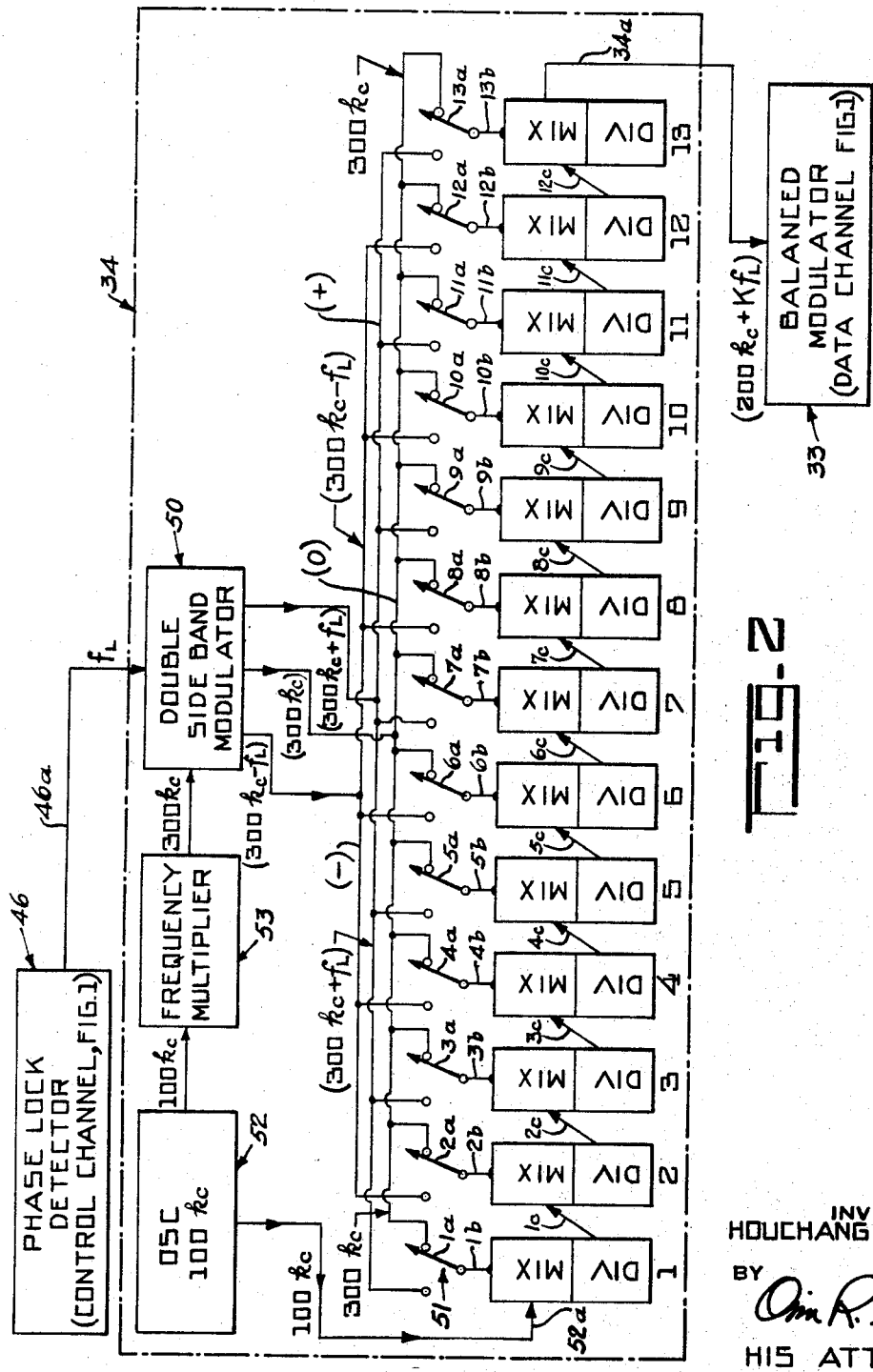
FIG. 2 is a generally diagrammatic illustration of the basic circuitry of the frequency ratio generator indicated in the system of FIG. 1.

In processing the signal $f_L$ fed to the frequency ratio generator at input lead 46a, FIGS. 1 and 2, this pure tone signal is first mixed with an HF local oscillator signal in a double side-band modulator 50. The HF signal, together with the two side-band signals, then are fed to a binary type switching circuitry generally indicated at 51. The switching circuitry is in turn connected to cascaded mixer and frequency divider units 1–13 which also receive at the first unit 1 another HF signal of lower multiple than the HF signal at 50. The output from the mixer-divider unit 13 at lead 34a is an HF signal of frequency $(200+Kf_L)$ kilocycles, constituting the control channel input for the balanced modulator 33, FIG. 1.

The constant K, above, is the ratio between the characteristic signal frequency of the part under test, and the characteristic signal frequency also of the component originally selected for representing r.p.m. The constant K is manually set into the frequency ratio generator by test personnel using previously established reference speed data and is conveniently done by push-button switches in the circuitry of 51; for example, if at reference r.p.m. the characteristic signal frequency of the test part (accessory gear box train) is 2800 c.p.s., and the signal frequency of the component selected for r.p.m. tracking (final compressor stage) is 5600 c.p.s., the ratio or "K value" is 0.5. The signal $Kf$ therefore represents correctly the instant adjusted signal frequency of the test part, as the K factor does not change with fluctuations in engine r.p.m., i.e., the frequencies of the discrete signals used in the data and control channels vary in the same ratio during engine speed fluctuation and so remain locked in phase.

Referring specifically to FIGS. 2 and 3, the output of a local 100 kc. crystal controlled oscillator 52 is multiplied in a frequency tripler 53; the 300 kc. reference signal, together with the pure tone signal $f_L$, constitute the inputs for the double side-band modulator 50. The two side-band output signals having frequencies (300 kc. $+f$) and (300 kc. $-f$) are obtained by a conventional modulator 54, FIG. 3, and upper and lower side-band crystal filters 55 and 56, respectively; these signals, together with the 300 kc. signal, are individually amplified at 57, 58 and 59, as shown in FIG. 3, for input to the mixer-divider units of FIG. 2.

The switching circuitry 51 is in practice embodied in a binary switch box having a plurality of single-throw, double-pole switches 1a to 13a, i.e., the same number as the mixer-divider units. The switch box has three input terminals designated (0), (+) and (−), respectively, each being connected to a separate main conductor or bus, similarly designated. The output terminals 1b, 2b, 3b, etc., of the switch box are connected respectively to the permanent junctions of the single-throw switches 1a, 2a, 3a, etc., and to the corresponding mixer-divider units 1, 2, 3, etc. The switches are all shown as normally in the unoperated position wherein they are all connected at the "back contact" to the (0) bus, i.e., for the 300 kc. signal from the double side-band modulator 50. The "front contact" of each odd-numbered switch, i.e., 1, 3, 5, etc., that is engaged upon positive switch "throw" or operation, is connected to the (+) bus, and the "front contact" of each even-numbered switch, i.e., 2, 4, 6, etc., is connected to the (—) bus. The switches may conveniently be "thrown" by conventional push buttons as in some radio sets.

The mixer-divider units constitute a set of identical electronic packages (13 in tthe present instance), each consisting of a balanced mixer "MIX" coupled with a binary divider "DIV," as shown in FIGS. 2 and 4. Each mixer-divider package has two input terminals and one output terminal. A first input terminal of each package connects the associated bus switch 1a, 2a, 3a, etc., to the mixer of that package. In the case of the first package 1, the second input terminal at 52a connects the 100 kc. oscillator 52 also to the mixer. The second input terminal at the mixer of each of the remaining packages 2 to 13 is connected to the output of the binary divider of the preceding package, referring to connections 1c, 2c, 3c, etc. The mixer output of the last package 13 constitutes the output of the frequency ratio generator 34 which is in turn connected at lead 34a to the balanced modulator, FIGS. 1 and 2.

FIG. 4 illustrates the general relationship and essential components of an individual mixer-divider package, such as No. 1. The 300 kc. input from the switch 1 and the 100 kc. oscillator input are connected to a balanced mixer 60 at the terminal leads 1b and 52a, respectively. The series-connected mixer components comprise the balanced mixer 60, a tuned amplifier 61 and a "Schmitt trigger" 62, the output of which is in turn connected to the input of the divider 63. As shown in FIG. 2, the output of the divider of package 1 is connected to one input of the next package mixer, whereas the output of the mixer of final package 13 constitutes, as indicated by dotted lead line 34a, the system output that is fed to the balanced modulator 33 of FIG. 1.

FIG. 5 illustrates in detail the transistorized circuitry of a mixer-divider package. The balanced mixer 60 shows the bus bar input at 1b connected to the input winding of a transformer $T_1$, the secondary terminals of which are connected respectively, to the base conductors of transistor valves $V_{1a}$ and $V_{1b}$ included in a dual-valve unit $V_1$. The 100 kc. input (for No. 1 stage), or the input from the divider of the preceding stage (for stages No. 2 to 13), is connected at 52a through conventional buffer circuitry 64 including the transistor $V_2$ and lead 65, to the midpoint of the $T_1$ secondary and to the input mixer network 66 of the matched dual-valve $V_1$, into which the two input signals are fed for mixing and initial amplification.

The $V_1$ transistor collector outputs at 67 and 68, respectively, are fed to the primary winding $T_p$ of a tuned differential transformer $T_2$ whose secondary $T_s$ feeds a difference-frequency signal by lead 69 to the first stage $V_3$ of a two-stage tuned amplifier 61. The second stage ($V_4$) output of the amplifier is connected to the parallel connected stages $V_5$ and $V_6$ of a conventional "Schmitt trigger" 62 for producing a constant amplitude square wave for the sinusoidal input, and a "spike pulse" output. The threshold sensitivity of the trigger is adjustable by a potentiometer 70. The trigger pulse output which corresponds in frequency to that of the transformer output signal is connected through a buffer transistor $V_7$ to the circuitry of a "flip-flop" or bistable circuit which essentially constitutes, together with the Schmitt trigger, the frequency divider. The flip-flop includes two parallel connected transistors $V_8$ and $V_9$, the base terminals of which are connected to the trigger output through a pair of diodes 71 and 72 for changing the conductive state of the flip-flop in known manner so as to halve the frequency, FIG. 4, and otherwise restore the signal to its original state. The output circuitry of the flip-flop at 73 is connected to the package output terminal (1c, 2c, etc.), FIGS. 2, 4 and 5. For the final mixer-divider stage No. 13, the output is from the Schmitt circuit, FIGS. 2 and 5, for eliminating the final dividing operation. This is for obtaining the desired 200 kc. signal for the balanced modulator input, FIG. 1.

Summarizing the circuitry of FIG. 5, the input mixing network 66 for the mixer transistors $V_{1a}$ and $V_{1b}$ includes a balancing potentiometer 66a for transistor matching, and the transistor output is fed to the differential transformer $T_2$ that is tuned by adjustment of windings $T_p$ and $T_s$ to a frequency of 200 kc. The transformer circuitry has a balancing function as regards phase differences between the incoming signals so that the signals are maintained at in-phase relation. These signals are amplified at 61 and passed through the Schmitt trigger and flip-flop for maintaining constant amplitude relation of the signal and for dividing purposes; and the finally processed signal is the output of the frequency ratio generator of the invention.

The method of operation is as follows: A signal assumed to have a frequency $f$ ($f=5852$ c.p.s. in the present instance), which slowly varies within a narrow range of audio spectrum, is fed into the double side-band modulator 50, FIG. 2, and combined with the 300 kc. carrier signal from the multiplier 53. The resulting upper side-band $(300+f)$ kc., the lower side-band $(300-f)$ kc., and the carrier itself (300 kc.) are fed into the switch box at the terminals marked (+), (—) and (0), respectively.

Each switch at its back contact normally connects its mixed-divider terminal to the input terminal marked "0." When a switch is pushed in, however, it connects its mixer-divider terminal to the (—) input if it is an even-numbered switch, and to the (+) input if it is an odd-numbered switch.

The desired frequency ratio R ranging from 0 to 2 (with a frequency resolution of better than 1 c.p.s. in the present case) can be obtained by pushing the proper combination of switches which would correspond to the binary fractional representation for the decimal number R. For example, if $R=.4111$, the binary fractional representation is 0.011010010011. This means the switches numbered 3, 4, 6, 9, 12 and 13 should be pushed in for obtaining $R=.4111$.

The signals at the output terminals 2b, 4b, . . . 12b of the respective switch bases are at either 300 kc. or $(300-f)$, kc., while at the outputs 1b, 3b, . . . 13b, the signals are at either 300 kc. or $(300+f)$ kc. Each of these outputs is applied to the first input of the corresponding mixer-divider package. The second input to each mixer is a 100 kc. modulated signal produced by the preceding package. The output of each mixer is tuned at the differential transformer $T_2$, FIG. 5, to the mean frequency of the difference between the two input frequencies which is near 200 kc. A perfectly balanced condition is obtained by controlling the phase and the amplitude simultaneously.

The balanced condition eliminates the even harmonic distortion generated within the modulator, plus all the spurious frequencies and harmonic and odd order cross modulations of the second input. Furthermore, the second input with a near square-shaped signal wave form has a reduced even order harmonic content.

As a result, the output of the balanced mixer is a pure tone signal of difference frequency; say $$(300+f) \text{ kc.} - 100 \text{ kc.} = (200+f) \text{ kc.}$$

for the case of the first stage. The output of the balanced mixer is then fed into the Schmitt trigger circuit 62 and then into the frequency divider to obtain a signal of one-half the frequency; say $$\left(100+\frac{f}{2}\right)\text{kc.}$$

which is in turn applied to the input of the following stage. In the second mixer the two input frequencies are $(300-f)$ kc. and $$\left(100+\frac{f}{2}\right)\text{kc.}$$

with a resulting output frequency of $$\left(100-f-\frac{f}{2}\right)\text{kc.}$$

For better illustration, the following "Table 1" is used in connection with the simplified block diagram, FIG. 6, of two mixer-divider stages, say stages 1 and 2.

TABLE 1.—EQUATIONS FOR FREQUENCY RATIO GENERATOR

Notations:
$F_0 = 100$ kc.
$f_0 =$ the input audio frequency
$f_n =$ the modulating frequency at the $n$th stage, $f_n = f_0$ or $f_n = 0$
$F_n =$ the output frequency of $n$th stage $$F_1 = \frac{3F_0 + f_1}{2} - \frac{F_0}{2} = F_0 + \frac{f_1}{2}$$

$$F_2 = \frac{3F_0 - f_2}{2} - \frac{F_1}{2} = F_0 - \frac{f_2}{2} - \frac{f_1}{4}$$

$$F_3 = \frac{3F_0 + f_3}{2} - \frac{F_2}{2} = F_0 + \frac{f_3}{2} + \frac{f_2}{4} + \frac{f_1}{8}$$

$$F_4 = \frac{3F_0 - f_4}{2} - \frac{F_3}{2} = F_0 - \frac{f_4}{2} - \frac{f_3}{4} - \frac{f_2}{8} - \frac{f_1}{16}$$

$F_5 = \text{---}$
$F_6 = \text{---}$
$F_7 = \text{---}$
$F_8 = \text{---}$
$F_9 = \text{---}$
$F_{10} = \text{---}$
$F_{11} = \text{---}$ $$F_{12} = F_0 - \frac{f_{12}}{2} - \frac{f_{11}}{4} - \frac{f_{10}}{8} - \frac{f_9}{16} - \frac{f_8}{32} - \frac{f_7}{64} - \frac{f_6}{128} - \frac{f_5}{256}$$
$$- \frac{f_4}{512} - \frac{f_3}{1{,}024} - \frac{f_2}{2{,}048} - \frac{f_1}{4{,}096}$$

$$F_{13} = 2F_0 + f_{13} + \frac{f_{12}}{2} + \frac{f_{11}}{4} + \frac{f_{10}}{8} + \frac{f_9}{16} + \frac{f_8}{32} + \frac{f_7}{64} + \frac{f_6}{128}$$
$$+ \frac{f_5}{256} + \frac{f_4}{512} + \frac{f_3}{1{,}024} + \frac{f_2}{2{,}048} + \frac{f_1}{4{,}096}$$

It is now obvious from the block diagram of FIG. 6 and Table 1 that the outputs from the successive mixers are alternatively upper and lower side-bands. At the output terminals, which are the terminals of the 13th mixer, the expression for the output frequency is:

$$F_0 = \left(100 + a_0 f + a_1 \frac{f}{2} + a_2 \frac{f}{4} \cdots a_{12} \frac{f}{4{,}096}\right)\text{kc.}$$

where $a_0, a_1, \ldots a_{12}$ are each zero or unity according to whether the corresponding switch is off or on.

The present frequency ratio generator therefore efficiently and simply provides frequencies that are proportional to the frequency of a pure tone audio signal with the proportionality coefficient varying in arbitrarily small steps from 0 to 2, for use in conjunction with a jet engine analyzer for synchronous detection and analysis of noise and vibration in a wide range of frequency spectrum.

It should be understood that this invention is not limited to specific details of construction and arrangement thereof herein illustrated, and that changes and modifications may occur to one skilled in the art without departing from the spirit of the invention. For example, it should be apparent to one skilled in the art that the principle of operation represented by the above may be used in any frequency range which could offer applications in areas other than jet engine analyzer; also, that the proportionality co-efficient may be extended beyond the range 0 to 2, for example, by using frequency multipliers to step up the frequency of the input signal. The values chosen as examples should not therefore represent limitations in the applications of the frequency ratio generator of this invention.

I claim:

1. A frequency ratio generator for producing an electrical signal of frequency that continuously bears a predetermined numerical ratio to a slowly varying frequency of a pure tone signal, comprising a source of high frequency signals, a double side-band modulator responsive to said pure tone signal and operably connected with the source of high frequency signals for mixing the pure tone signal with a local high frequency signal from the source, the outputs of said modulator consisting of a main signal of the same frequency as said local signal and upper and lower side-band signals of frequencies determined by the frequency of the pure tone signal, signal processing means connected with the side-band modulator and said source of high frequency signals for receiving a second high frequency signal from the source of high frequency signals and including multistage signal mixing and binary dividing means, and also switching means between the modulator and the multi-stage signal mixing and binary dividing means for selectively connecting respective stages of said processing means to certain modulator outputs according to the binary representation of said numerical ratio for producing at the output stage a side-band signal containing the aforesaid signal of predetermined ratio frequency.

2. A frequency ratio generator as specified in claim 1, wherein the frequency of the pure tone signal fed to the double side-band modulator is within the audio range and varies within a limited spectrum with respect to a reference center frequency, and the modulator high frequency input signal is of constant amplitude.

3. A frequency ratio generator as specified in claim 1, wherein the frequency of the second high frequency signal is one-third that of the local signal, and an initial stage mixer of the processing means is fed by said second high frequency signal.

4. A frequency ratio generator as specified in claim 1, wherein the signal processing means comprises a plurality of stages of signal mixers and binary frequency dividers and a first stage mixer receives the second high frequency signal, and the switching means is connected to an input of each mixer, the mixers and dividers being connected to cascade wherein the output of a first divider is an input of the next mixer, the switching means being selectively positioned according to the binary representation of the aforesaid numerical ratio for progressive division of succeeding frequency differences of input signals through successive stages.

5. A frequency ratio generator as specified in claim 4, wherein the switching means comprises manually operable individual switches, one for each mixer respectively, and the first stage mixer, together with succeeding odd-numbered stage mixers, can be connected by respective switches to either the modulator high frequency signal output or to a certain one of the side-band signal outputs, and the succeeding even-numbered stage mixers can be selectively connected by respective switches to either the aforesaid modulator high frequency signal output or the other of said side-band signal outputs.

6. A frequency ratio generator as specified in claim 4, wherein the mixers and the dividers, respectively, of corresponding stages constitute similar units, arranged in pairs, and the pairs are connected in cascade.

7. A frequency ratio generator as specified in claim 1, wherein the source of the second high frequency signal is a stable crystal controlled oscillator, and one output of said oscillator is connected to a frequency multiplier for supplying the local high frequency signal to the double side-band modulator, and another output of said oscillator is continuously connected to an input of the signal binary processing means.

8. A frequency ratio generator as specified in claim 5, wherein the modulator has three output terminals, each connected to a bus conductor, and each manual switch is of the single-throw, double-pole type and is normally connected at one pole to the bus having the modulator output high frequency signal thereon, the other pole being connected, in alternate switches, to the upper and lower side-band signal buses, respectively.

9. A frequency ratio generator as specified in claim 1, wherein a signal mixer and associated binary frequency divider constitute series-connected circuitry including a balanced signal mixer having an input mixing network for a dual-transistor amplifier, a tuned differential transformer connected to the output of the amplifier, a "Schmitt trigger" for processing the transformer signal, and bistable circuitry for dividing the frequency of the trigger signal.

10. A frequency ratio generator as specified in claim 9, wherein the output of a final stage "Schmitt trigger" is the output signal of the signal processing means.

References Cited

UNITED STATES PATENTS 2,498,242  2/1950  Boykin _____ 332—22 X

ROY LAKE, *Primary Examiner.*

L. J. DAHL, *Assistant Examiner.*

U.S. Cl. X.R.

332—17, 20